(12) United States Patent
Griewenka

(10) Patent No.: US 11,187,302 B2
(45) Date of Patent: Nov. 30, 2021

(54) REDUCTION GEAR AND GEAR MOTOR

(71) Applicant: ADIENT ENGINEERING AND IP GMBH, Burscheid (DE)

(72) Inventor: Norbert Griewenka, Solingen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/040,076

(22) PCT Filed: Mar. 18, 2019

(86) PCT No.: PCT/EP2019/056691
§ 371 (c)(1),
(2) Date: Sep. 22, 2020

(87) PCT Pub. No.: WO2019/179934
PCT Pub. Date: Sep. 26, 2019

(65) Prior Publication Data
US 2021/0018067 A1    Jan. 21, 2021

(30) Foreign Application Priority Data

Mar. 23, 2018  (DE) .................... 10 2018 107 026.8
Jul. 20, 2018   (DE) .................... 10 2018 117 576.0

(51) Int. Cl.
*F16H 1/32*   (2006.01)
*F16H 1/16*   (2006.01)
(Continued)

(52) U.S. Cl.
CPC .................. *F16H 1/32* (2013.01); *F16H 1/16* (2013.01); *F16H 1/2863* (2013.01);
(Continued)

(58) Field of Classification Search
CPC ............ F16H 1/16; F16H 1/32; F16H 1/2863; H02K 7/1166
See application file for complete search history.

(56) References Cited

U.S. PATENT DOCUMENTS 7,235,030 B2    6/2007  Becker et al.
8,936,526 B2 *  1/2015  Boutouil .............. B60N 2/2252
                                                475/162
(Continued)

FOREIGN PATENT DOCUMENTS

CN        106114303 A      11/2016
DE     102004043310 B4      8/2009
(Continued)

OTHER PUBLICATIONS

The International Bureau of WIPO, International Preliminary Report on Patentability, dated Sep. 29, 2020, 15 pages, issued in PCT/EP2019/056691, The International Bureau of WIPO, Geneva, Switzerland.
(Continued)

*Primary Examiner* — Huan Le
(74) *Attorney, Agent, or Firm* — Marshall & Melhorn, LLC

(57) ABSTRACT

A reduction gear may have a housing, a first gear stage and a second gear stage. The second gear stage may have an externally toothed first gear wheel and an internally toothed second gear wheel which meshes with the first gear wheel and is at least indirectly rotationally fixed to an output. The reduction gear may also have a circumferential eccentric, which is driven by the first gear stage, for driving a rolling motion from the second gear wheel to the first gear wheel. A torque support disc is guided in a linearly movable manner in a first direction along two sliding surfaces of the bearing point. A rib bears against the torque support disc and elastically pretensions the torque support disc in the direc-
(Continued)

Figure 1:
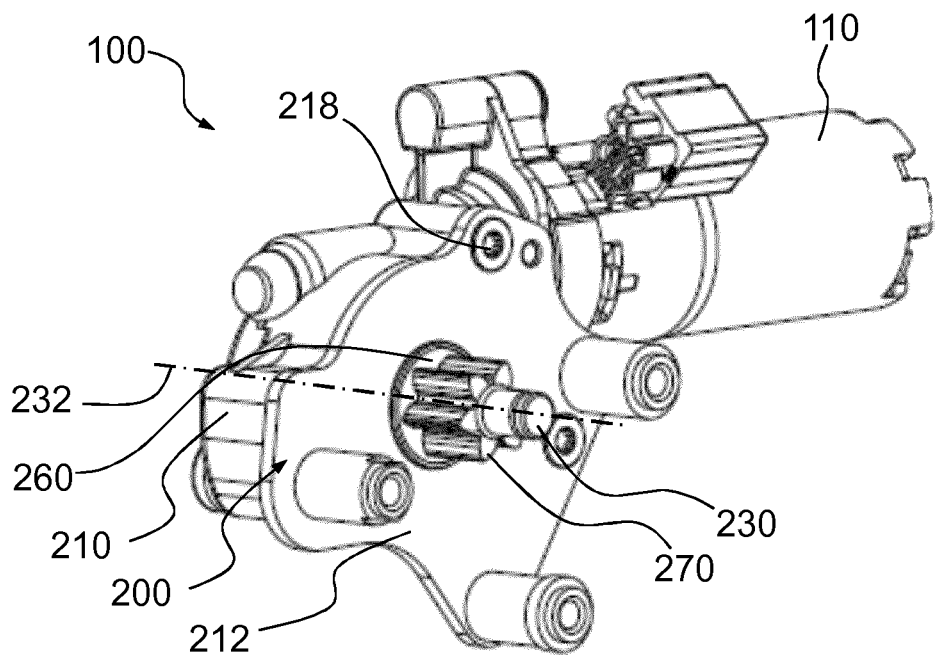

tion of a further sliding surface of the bearing point. A gear motor having an electric motor may use the reduction gear.

15 Claims, 7 Drawing Sheets

(51) Int. Cl.
*F16H 1/28* (2006.01)
*H02K 7/116* (2006.01)
*B60N 2/02* (2006.01)
*B60N 2/16* (2006.01)

(52) U.S. Cl.
CPC .......... *H02K 7/1166* (2013.01); *B60N 2/0232* (2013.01); *B60N 2/165* (2013.01)

(56) References Cited

U.S. PATENT DOCUMENTS

| | | | |
|---|---|---|---|
| 10,500,984 B2 | 12/2019 | Hoffmann | |
| 2007/0209857 A1* | 9/2007 | Wolf | B60N 2/933 180/315 |
| 2013/0180348 A1* | 7/2013 | Andres | B60N 2/2252 74/89.14 |
| 2017/0363176 A1* | 12/2017 | Noguchi | F16H 1/32 |

FOREIGN PATENT DOCUMENTS

| | | |
|---|---|---|
| DE | 102013009846 A1 | 12/2013 |
| DE | 102015212823 B3 | 8/2016 |

OTHER PUBLICATIONS

European Patent Office, International Search Report with Written Opinion, issued in PCT/EP2019/056691, dated May 28, 2019, 12 pages, European Patent Office, Rijswijk, Netherlands.

* cited by examiner

REDUCTION GEAR AND GEAR MOTOR

The invention relates to a reduction gear having a housing, a first gear stage and a second gear stage, wherein the second gear stage comprises an externally toothed first gear wheel and an internally toothed second gear wheel which meshes with the first gear wheel and is at least indirectly connected non-rotatably to an output and a circumferential eccentric which is driven by the first gear stage, for driving a rolling motion from the second gear wheel to the first gear wheel, the first gear wheel being moved by the eccentric on a circular path, and a torque support disk which is arranged axially next to the first gear wheel and prevents the first gear wheel from performing a relative rotation with respect to the housing, wherein the torque support disk is guided in a first direction in a linearly movable manner in at least one bearing point of the housing along at least two sliding surfaces of the at least one bearing point. The invention also relates to a gear motor.

PRIOR ART

A generic reduction gear having a torque support disk is known from DE 10 2015 212 823 B3. A reduction gear having an additional third gear stage is known from DE 10 2004 043 310 B4.

Problem

The problem addressed by the invention is that of improving a reduction gear of the kind referred to above. In particular, the clearance between a torque support disk and a housing of the reduction gear is to be reduced. In addition or alternatively, the clearance between an eccentric and a gear wheel of the reduction gear driven by said eccentric is to be reduced. Moreover, a gear motor with reduced clearance is to be provided.

Solution

This problem is solved according to the invention by a reduction gear having a housing, a first gear stage and a second gear stage, wherein the second gear stage has an externally toothed first gear wheel and an internally toothed second gear wheel which meshes with the first gear wheel and is at least indirectly connected non-rotatably to an output, and a circumferential eccentric which is driven by the first gear stage, for driving a rolling motion from the second gear wheel to the first gear wheel, the first gear wheel being moved by the eccentric on a circular path, and a torque support disk which is arranged axially next to the first gear wheel and prevents the first gear wheel from performing a relative rotation with respect to the housing, wherein the torque support disk is guided in a linearly movable manner in a first direction in at least one bearing point of the housing along at least two sliding surfaces of the at least one bearing point. At least one sliding surface of the bearing point is formed by at least one rib arranged in the bearing point, wherein the rib bears against the torque support disk and the rib elastically pretensions the torque support disk in the direction of a further sliding surface of the bearing point in such a manner that a clearance between the bearing point and the housing in a second direction, in particular a second direction oriented perpendicularly to the first direction, is reduced.

The fact that at least one sliding surface of the bearing point is created by at least one rib arranged in the bearing point, the rib resting against the torque support disk and the rib elastically pretensioning the torque support disk in the direction of a further sliding surface of the bearing point in such a manner that a clearance between the bearing point and the housing in a second direction, in particular a second direction oriented perpendicularly to the first direction, is reduced, means that a reduction gear without a clearance or with only a small clearance is provided. The ribs are preferably plastically and elastically deformed. Through plastic deformation of the ribs during assembly of the torque support disk in the housing, friction between the ribs and the torque support disk resulting from the elastic deformation is limited to a maximum value. This means that undesirably high friction coefficients can be avoided.

The torque support disk is preferably guided in the housing in a linearly movable manner in a first direction. The first gear wheel is preferably guided in the torque support disk in a linearly movable manner in a second direction. The at least one guiding groove in the torque support disk runs in the second direction. The second direction is advantageously oriented perpendicularly to the first direction. On account of the two directions arranged perpendicularly to one another, two linear guides are provided which allow a movement of the first gear wheel in all directions of a plane arranged perpendicularly to the rotational axis. The movement is limited by an eccentric to a wobbling movement.

The torque support disk can be guided in two bearing points. The torque support disk is preferably guided in precisely two bearing points. Each of the two bearing points may exhibit two sliding surfaces. Each sliding surface preferably comprises multiple ribs. The at least one rib preferably extends perpendicularly to the first direction.

The first gear wheel and/or the torque support disk may be made of metal, preferably of steel. The torque support disk, at least a basic part of the torque support disk, is preferably a flat, disk-shaped component. The housing is preferably produced from a plastic.

At least one spring element can balance a radial clearance between a bearing element of the eccentric and the first gear wheel. In this way, the reduction gear may experience a clearance reduction irrespective of the clearance reduction of the torque support disk or in addition to the clearance reduction of the torque support disk.

The at least one spring element may be produced from an elastomer material. The at least one spring element may be produced from a rubber material. The at least one spring element may be produced from a plastics material. The at least one spring element may be produced from a spring steel. The at least one spring element may be produced from a spring plate. The at least one spring element may be produced from a spring wire. The at least one spring element may be a compression spring. Multiple spring elements, in particular three spring elements, may balance the radial clearance between the bearing surface off the eccentric and the first gear wheel.

The problem is moreover solved by a gear motor having an electric motor and a reduction gear according to the invention.

A gear motor having an electric motor and a reduction gear according to the invention is preferably characterized in that a first gear stage comprises a worm connected to a motor output shaft in a non-rotatable manner and a worm gear, wherein an eccentric is in particular fixedly connected to the worm gear. A gear motor of this kind can be used as the drive of a height-adjustment device for a vehicle seat, for example.

FIGURES AND EMBODIMENTS OF THE INVENTION

Figure 2:
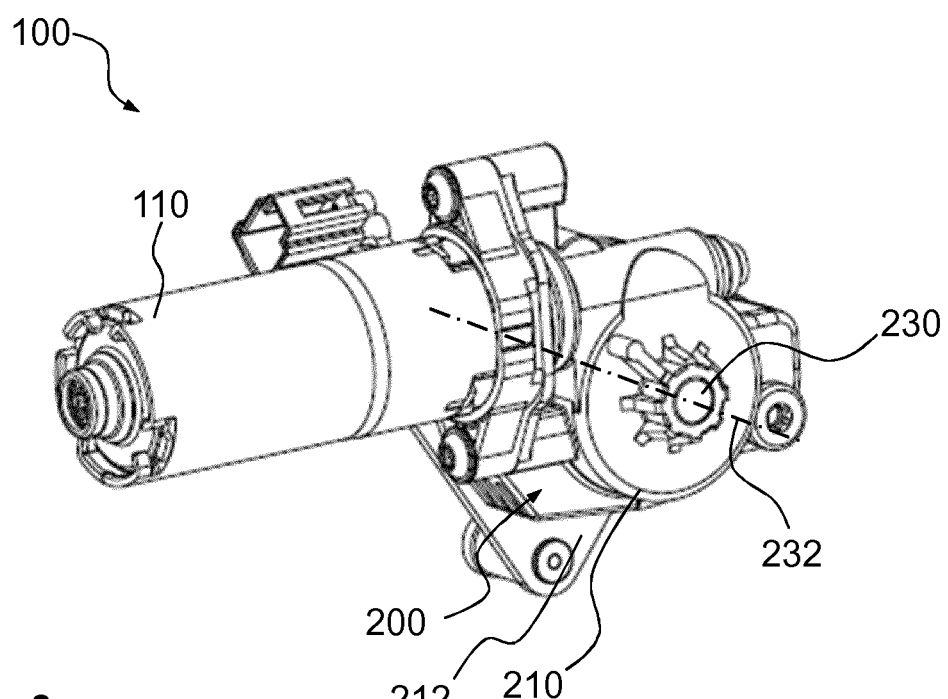
Figure 3:
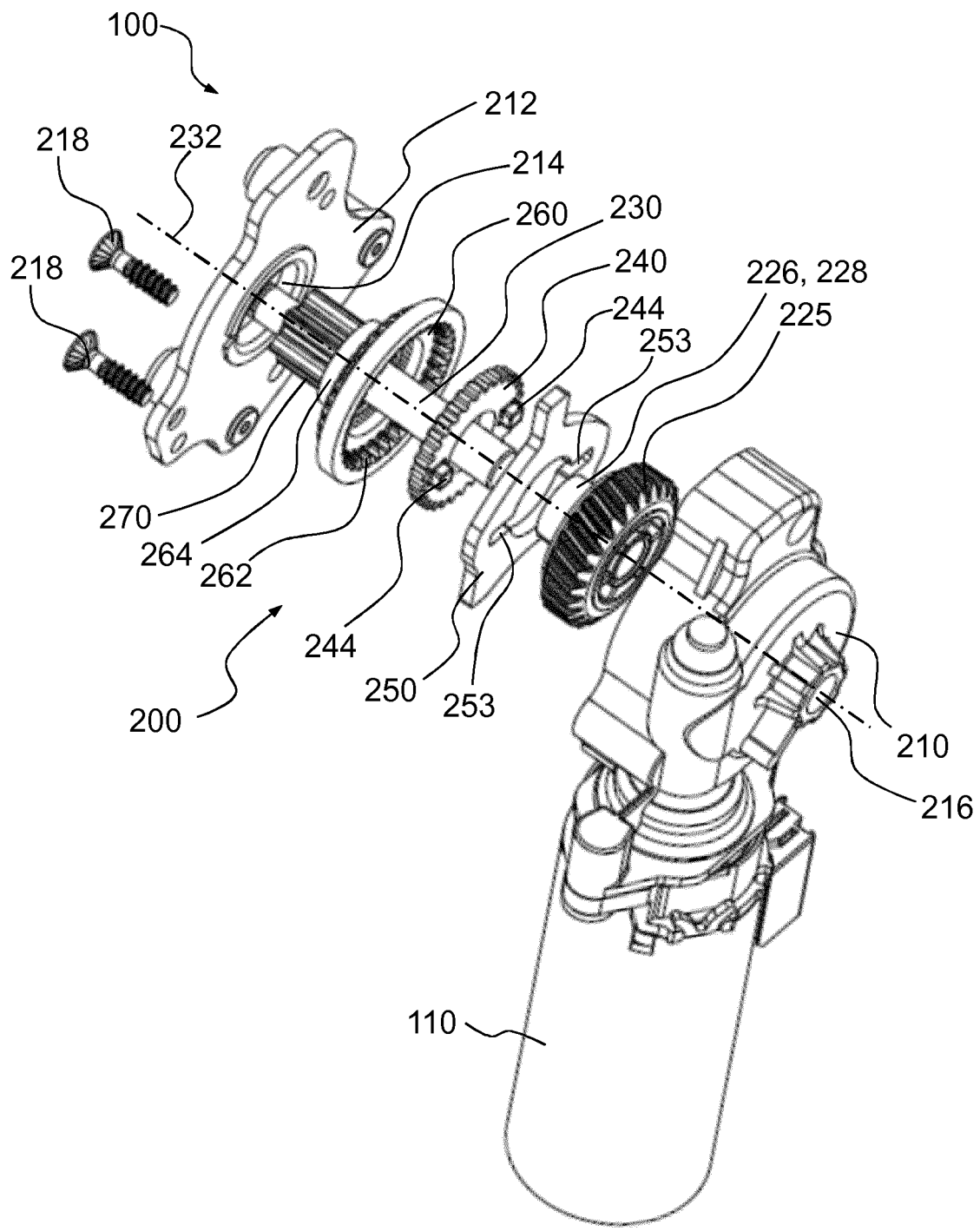
Figure 4:
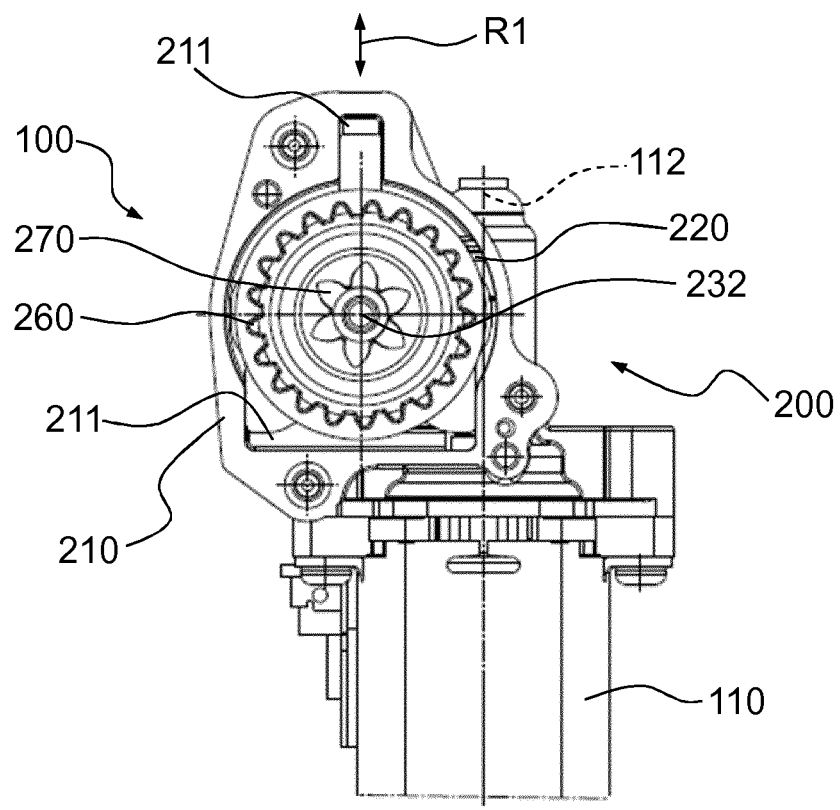
Figure 5:
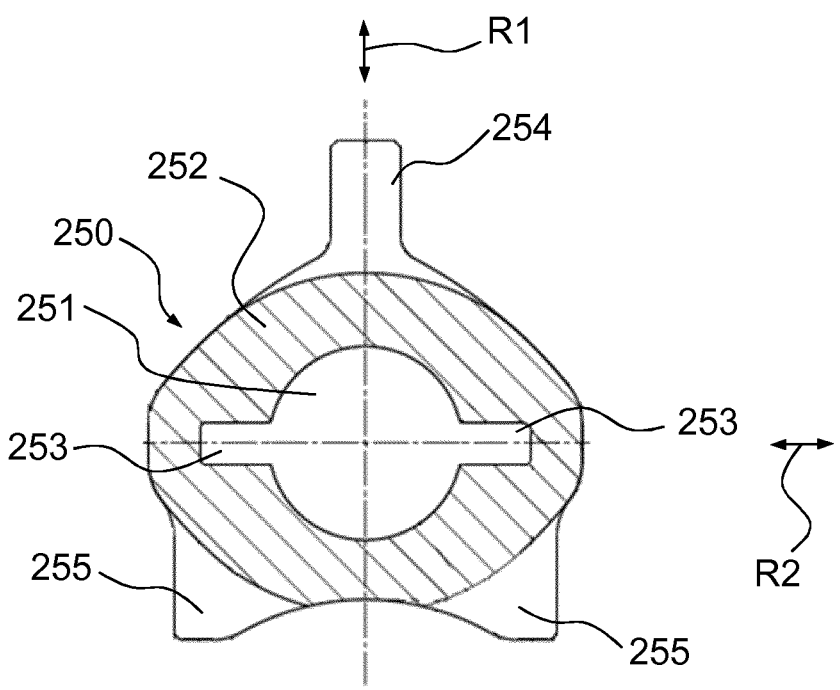
Figure 6:
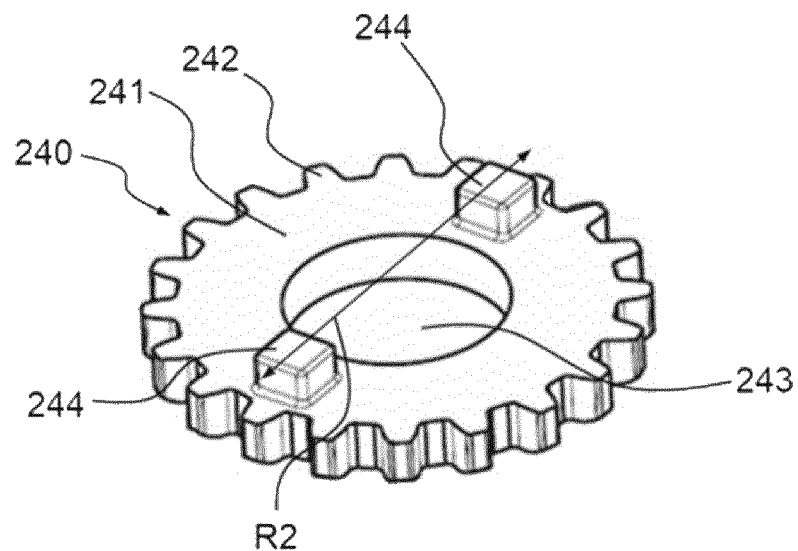
Figure 7:
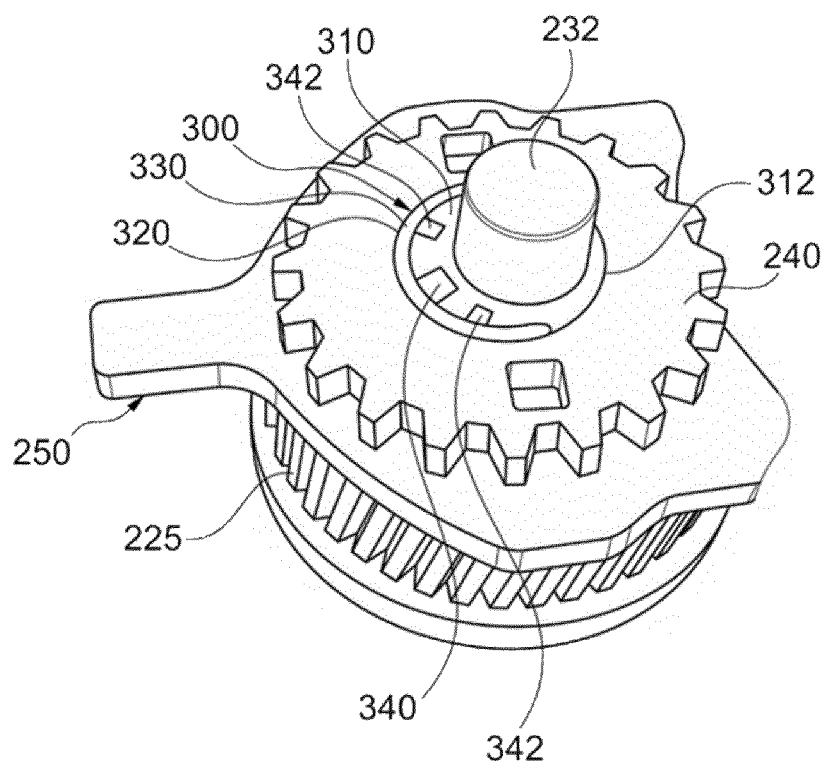
Figure 8:
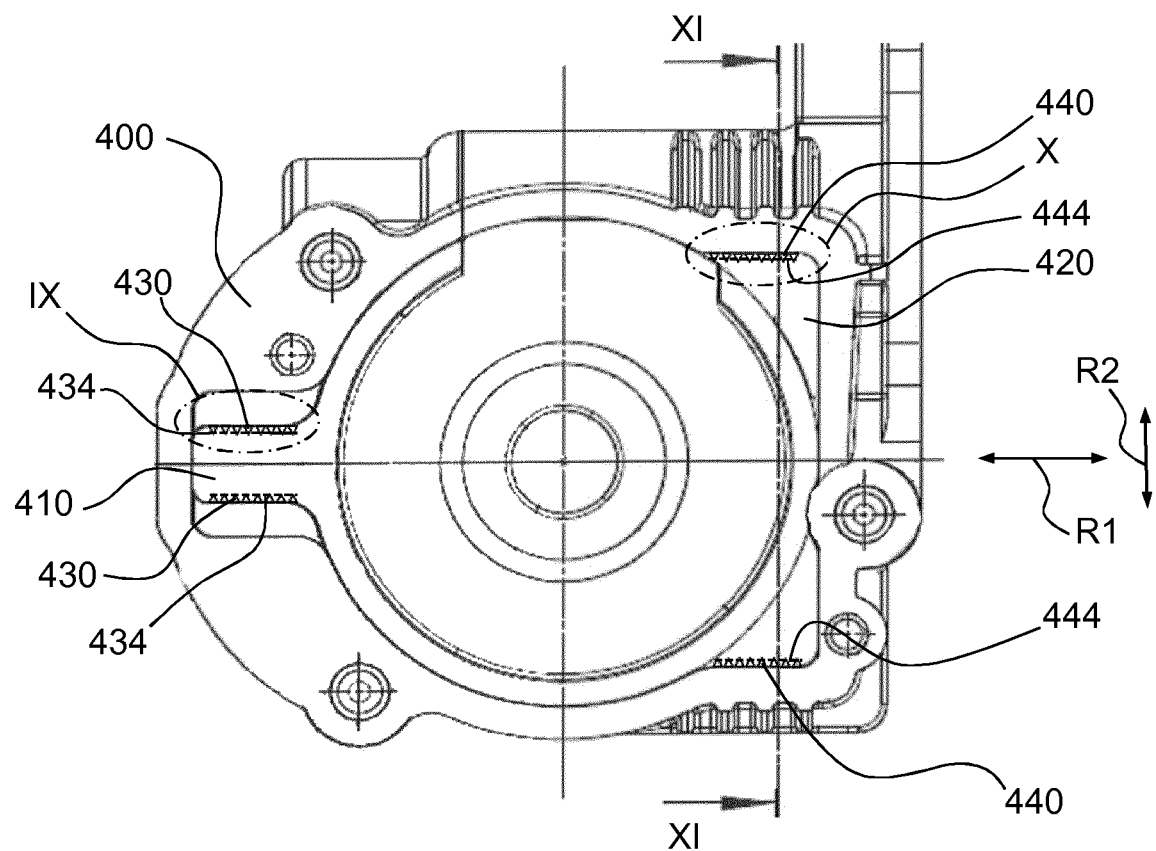
Figure 9:
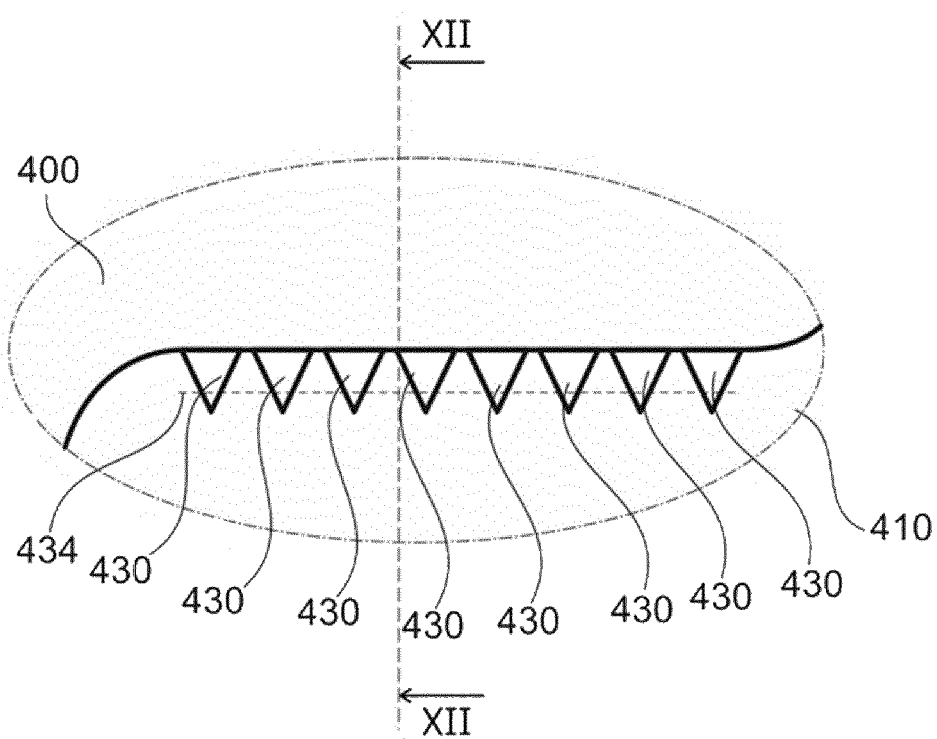
Figure 10:
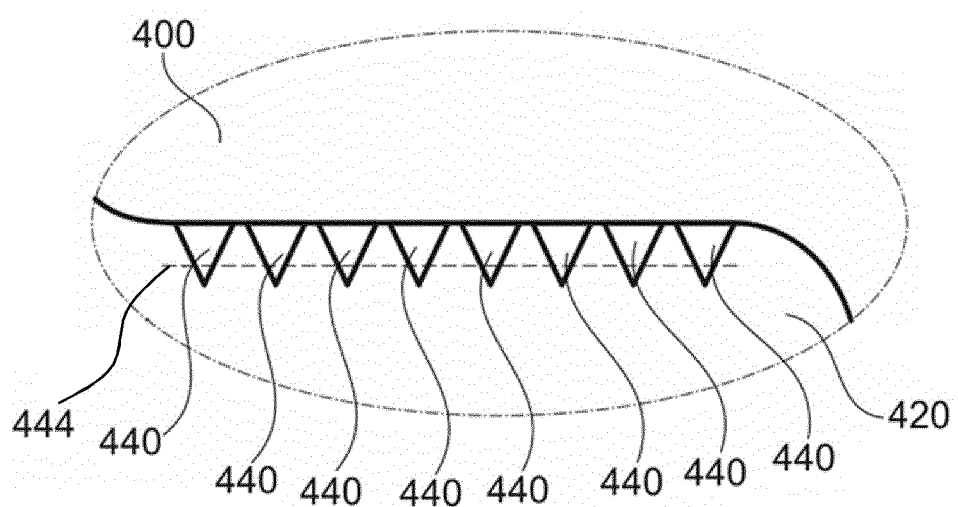
Figure 11:
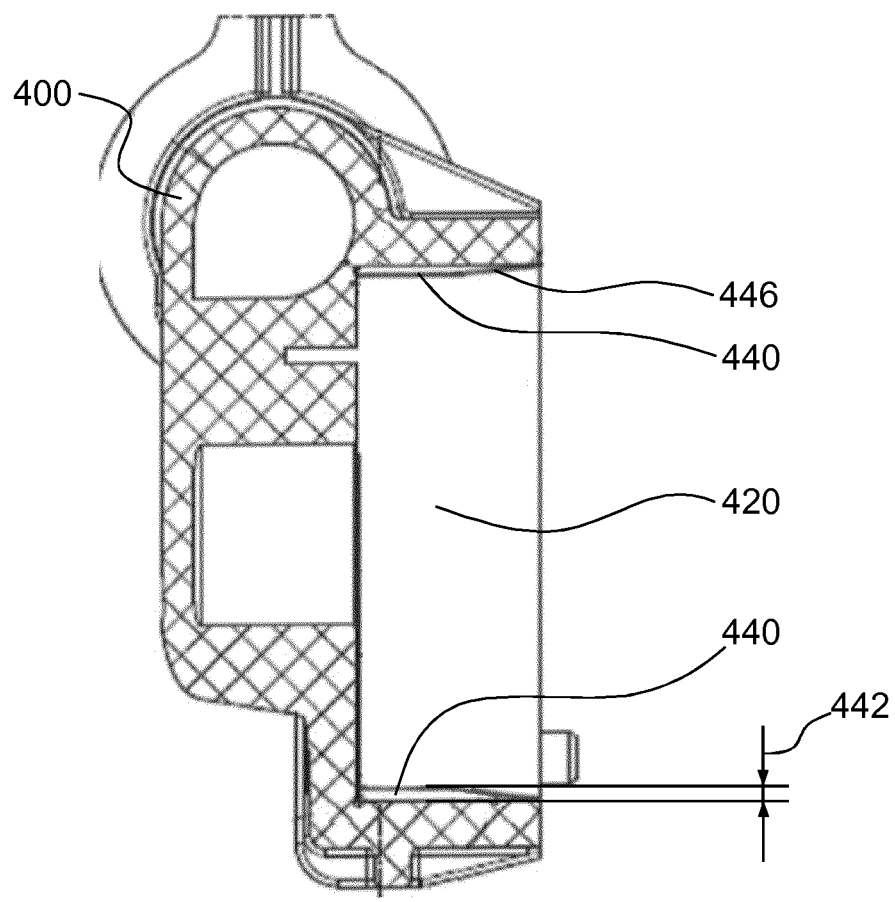
Figure 12:
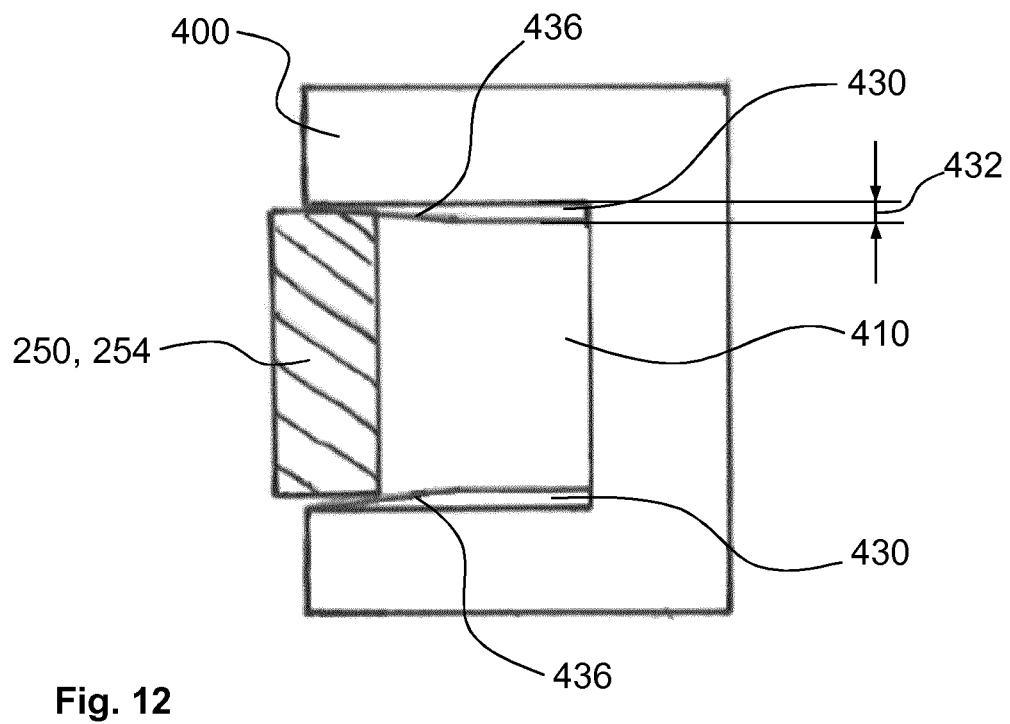

The invention is explained in greater detail below with the help of a gear motor depicted in FIGS. 1 to 6 and known from the prior art, a development of the gear motor known from the prior art depicted in FIG. 7, and an exemplary embodiment according to the invention depicted in FIGS. 8 to 12. The invention is not limited to this exemplary embodiment, however. In the drawing:

FIG. 1: shows a perspective representation of a gear motor known from the prior art having an electric motor and a reduction gear, FIG. 2: shows a further perspective view of the gear motor from FIG. 1 in an opposite viewing direction compared with FIG. 1, FIG. 3: shows an exploded view of the gear motor from FIG. 1, FIG. 4: shows a plan view of the gear motor from FIG. 1 without a housing cover, FIG. 5: shows a plan view of a torque support disk of the reduction gear of the gear motor from FIG. 1, FIG. 6 shows a perspective view of a first gear wheel of a second gear stage of the reduction gear of the gear motor from FIG. 1, FIG. 7: shows a perspective view of the components motor output shaft, worm gear, eccentric, first gear wheel, and torque support disk of a reduction gear or gear motor according to the invention according to a development of the gear motor known from the prior art, FIG. 8: shows a plan view of a housing (without a housing cover) of a reduction gear or gear motor according to the invention, FIG. 9: shows the detail IX from FIG. 8, namely the housing in the region of a first bearing point, FIG. 10: shows the detail X from FIG. 8, namely the housing in the region of a second bearing point, FIG. 11: shows a section through the housing along the line XI-XI in FIG. 8, and FIG. 12: shows a section through the housing along line XII-XII in FIG. 9, supplemented by a corresponding section through a torque support disk during an assembly of the torque support disk in the housing.

With the help of FIGS. 1 to 6, a gear motor 100 known from the prior art having an electric motor 110 and a reduction gear 200 is initially described below.

The reduction gear 200 is arranged almost entirely in a housing 210. The housing 210 is largely closed by a housing cover 212. The housing cover 212 has a circular cover opening 214 which is aligned with a housing opening 216 in the housing 210. The housing cover 212 is screwed to the housing 210 by means of multiple screws 218. The housing 210 is connected to the electric motor 110.

The electric motor 110 has a motor output shaft 112 which cannot be seen in the figures because it is arranged sectionally within the electric motor 110 and sectionally within the housing 210. The motor output shaft 112 is indicated by a dot-dash line in FIG. 4. The motor output shaft 112 projects into the housing 210 of the reduction gear 200. A screw-shaped worm 220 of a first gear stage of the reduction gear 200 is arranged at an end of the motor output shaft 112 facing away from the electric motor 110 and connected to the motor output shaft 112 in a non-rotatable manner. The worm 220 is therefore rotated during actuation of the electric motor 110 at the speed thereof. The motor output shaft 112 of the electric motor 110 acts simultaneously as a gear input shaft of the reduction gear 200.

A worm gear 225 in the present case is mounted rotatably on an output shaft 230. One end of the output shaft 230 is mounted rotatably in the housing opening 216 of the housing 210. The output shaft 230 is arranged at an angle of 90° to the motor output shaft 112.

The worm 220 and the worm gear 225 create the first gear stage of the reduction gear 200. The worm gear 225 comprises an eccentric 226. The eccentric 226 has a largely hollow-cylindrical form, wherein an inner, cylindrical opening is aligned with a rotational axis 232 of the output shaft 230. The terms "radial" and "axial" which are used relate to the rotational axis 232. A cylindrical outer bearing surface 228 of the eccentric 226 is arranged offset by an eccentricity, for example 1.2 mm to 1.3 mm, with regard to the rotational axis 232. A central axis of the outer bearing surface 228 of the eccentric 226 runs parallel to the rotational axis 232, but is radially offset by the eccentricity. Due to the bearing of the worm gear 225 on the output shaft 230, a rotation of the worm gear 225 causes an outer bearing surface 228 of the eccentric 226 wobbling about the rotational axis 232.

A first gear wheel 240 has a disk-shaped base body 241 which supports external toothing 242 on its outer circumference. The base body 241 has a bearing opening 243 which uses a bearing of the first gear wheel 240 on the eccentric 226 of the worm gear 225, preferably with a bearing bush inserted in between. Two guiding pins 244 project in the axial direction from the base body 241 of the first gear wheel 240.

A torque support disk 250 is arranged between the worm gear 225 and the first gear wheel 240 viewed in the axial direction. The torque support disk 250 is also referred to as the guiding disk. The torque support disk 250 is a largely planar, plate-shaped and mirror-symmetrically configured component which has a through opening 251 centrally to a mirror axis, the inner diameter of said through opening being greater than the total outer diameter of the eccentric 226 and the eccentricity of the eccentric 226. The eccentric 226 projects through the through opening 251 in the direction of the first gear wheel 240. The torque support disk 250 prevents the first gear wheel 240 from performing a relative rotation with respect to the housing 210. At the same time, however, the torque support disk 250 allows a circumferential wobbling displacement of the first gear wheel 240 during a rotational movement of the worm gear 225 caused by the eccentric 226. For this purpose, the torque support disk 250 comprises two guiding grooves 253 which are arranged diametrically opposite one another.

Starting from the through opening 251, the guiding grooves 253 run outwardly in a radial direction and act as a receiving means for the two guiding pins 244 of the first gear wheel 240. The length of the guiding grooves 253 is selected in such a manner that the previously described wobbling movement of the first gear wheel 240 is possible on account of a linear relative movability between the guiding grooves 253 and the guiding pins 244.

The torque support disk 250 also has a first guiding lug 254 which projects from the base part 252 in a radial direction and two second guiding lugs 255. The two second guiding lugs 255 run in parallel to one another and receive the axis of reflection of the torque support disk 250 centrally between them. By means of the first guiding lug 254 and the two second guiding lugs 245, the torque support disk 250 is guided in a linearly movable manner in corresponding bearing points 211 in the housing 210, namely in a first direction R1. The bearing points 211 in the present case are recesses in the housing 210. The first direction R1 runs perpendicularly to a second direction R2 which results from the relative movability between the guiding grooves 253 of the torque support disk 250 and the guiding pins 244 of the first gear wheel 240. Due to the previously described linear guide between the housing 210 and the torque support disk 250 in the first direction R1 and the previously described linear guide between the first gear wheel 240 and the torque support disk 250 in the second direction R2, the first gear wheel 240 can wobble with the eccentricity of the eccentric 226 relative to the housing 210, without thereby rotating relative to the housing 210.

The external toothing 242 of the first gear wheel 240 is constantly meshed with an internal toothing 262 of a second tooth gear 260 which is connected to the output shaft 230 in a non-rotatable manner. The first gear wheel 240 and the second gear wheel 260 create a second gear stage of the reduction gear 200. The internal toothing 262 has at least one tooth more than the external toothing 242. This means that the wobbling movement of the first gear wheel 240 produces a rotational movement of the second gear wheel 260 about the rotational axis 232.

On the side of the second gear wheel 260 facing away from the first gear wheel 240, the second gear wheel 260 has a bearing collar 264 which is used for a rotational bearing of the second gear wheel 260 in the cover opening 214 of the housing cover 212.

An output pinion 270 is arranged on the side of the housing cover 212 facing away from the second gear wheel 260 and is connected in a non-rotatable manner to the output shaft 230 and the second gear wheel 260. The output pinion 270 is used as an interface with a device being driven, in particular for an adjustment device of a motor vehicle seat.

A reduction gear of a gear motor according to a development of the reduction gear 200 known from the prior art only partially represented in FIG. 7 corresponds in terms of function and design, with the exception of an eccentric 300, to the previously described reduction gear 200 of the gear motor 100 known from the prior art, which is why the description thereof also applies to the development of the reduction gear, unless described otherwise below. Components of the gear motor according to the invention which are unchanged compared with the gear motor 100 known from the prior art are therefore assigned the same reference numbers as those of the gear motor 100.

FIG. 7 shows a perspective view of the components motor output shaft 112, worm gear 225, first gear wheel 240, torque support disk 250, and eccentric 300 of the reduction gear or gear motor according to the development of the reduction gear known from the prior art. The components motor output shaft 112, gear wheel 225, first gear wheel 240, and torque support disk 250 are unchanged by comparison with the previously described gear motor 100 known from the prior art, which is why a new description of these components can be dispensed with.

The eccentric 300 has a multi-part configuration. A base body 310 of the eccentric 300 is connected to the worm gear 225. The base body 310 of the eccentric 300 may be integrally connected to the worm gear 225. The eccentric 300 is rotatable about a rotational axis 232, in the present case a shaft. The directional data of a cylinder coordinates system used below, such as axial, radial and circumferential direction, in particular, relate to the rotational axis 232.

The base body 310 has a circular ring-shaped outer contour portion 312 arranged offset in respect of the rotational axis 232 by an eccentricity. The outer contour portion 312 extends in the circumferential direction in the present case over an angle of approximately 180°. The outer contour portion 312 is an integral part of a largely cylindrical external bearing surface 320 for the rotatable bearing of the first gear wheel 240 on the eccentric 300 and for driving a relative rolling movement of the second gear wheel 260 on the first gear wheel 240. The outer contour of the base body 310 is offset radially inwardly between two ends of the outer contour portion 312 viewed in the circumferential direction.

The outer bearing surface 320 is used for the rotatable bearing of the first gear wheel 240 on the eccentric 300 and is created by the outer contour portion 312 and a bearing element 330. The outer contour portion 312 and the bearing element 330 adjoin one another in the circumferential direction. The shape of the bearing element 330 corresponds to a ring portion. The bearing element 330 extends in the circumferential direction over an angle of approximately 180°. The bearing element 330 is inserted in the radially inwardly offset region of the base body 310. The material thickness of the bearing element 330 roughly corresponds in the radial direction to the depth of the radially inwardly offset outer contour of the base body 310 between the two ends of the outer contour portion 312. The bearing element 330 is displaceable to a limited extent in the radial direction in respect of the base body 310, as a result of which a radial clearance between the outer bearing surface 320 of the eccentric 300 and the first gear wheel 240 can be reduced. A circular cylindrical opening in the first gear wheel 240 receives the eccentric 300 or the bearing surface 320 thereof.

Between the bearing element 330 and the base body 310 are arranged a first spring element 340 and two second spring elements 342. The spring elements 340, 342 work in such a manner that the radial clearance between the bearing surface 320 and the first gear wheel 240 is reduced. For this purpose, the spring elements 340, 342 outwardly pretension the bearing element 330 relative to the base body 310.

The first spring element 340 is approximately cuboidal in the present case. The first spring element 340 is made of an elastomer material in the present case. The two second spring elements 342 in the present case are roughly cuboidal, wherein the volume of the second spring elements 342 is smaller in each case than the volume of the first spring element 340. The two second spring elements 342 are each made of an elastomer material in the present case.

The three spring elements 340, 342 are arranged in the region with a radially inwardly offset outer contour of the base body 310. The first spring element 340 is arranged in the region of the maximum distance between the rotational axis 232 and the outer bearing surface 320 viewed in the circumferential direction. The first spring element 340 is introduced into a depression in the base body 310 in such a manner that in a relaxed state and prior to assembly of the first gear wheel 240 on the eccentric 300 it projects in the radial direction partially beyond the outer contour of the base body 310. The two second spring elements 342 are arranged symmetrically to the first spring element 340 viewed in the circumferential direction. The two second spring elements 342 are each introduced into a depression in the base body 310 in such a manner that in a relaxed state and prior to assembly of the first gear wheel 240 on the eccentric 300 they project in the radial direction partially beyond the outer contour of the base body 310.

The three spring elements 340, 342 pretension the first bearing element 330 radially outwards. In order to assemble the first gear wheel 240 on the eccentric 300, the bearing element 330 is pushed radially inwards by means of an assembly device and with pretensioning of the spring elements 340, 342, and the gear wheel 240 is then pushed onto the eccentric 300. The assembly device is then removed. Due to the pretensioning of the spring elements 340, 342, the bearing element 330 is pushed radially outwards again in respect of the base body 310 so far that the clearance between the bearing surface 320 of the eccentric 300 and the first gear wheel 240, in other words the circular cylindrical opening of the first gear wheel 240, is reduced.

A reduction gear of a gear motor according to the invention which is only partially depicted in FIGS. 8 to 12 corresponds in terms of function and design, with the exception of a housing 400, to the previously described reduction gear 200 of the gear motor 100 known from the prior art, which is why the description thereof also applies to the gear motor according to the invention and the reduction gear according to the invention, unless described otherwise below. Components of the gear motor according to the invention which are unchanged compared with the gear motor 100 known from the prior art are therefore assigned the same reference numbers as those of the gear motor 100.

FIGS. 8 to 12 show the housing 400 of the reduction gear or gear motor according to the invention. The remaining components are unchanged compared with the previously described gear motor 100 known from the prior art. Alternatively, the housing 400 may also be combined with the developed eccentric 300 depicted in FIG. 7 and previously described.

According to the previously described prior art, a torque support disk 250 has a first guiding lug 254 and two second guiding lugs 255. By means of the first guiding lug 254, the torque support disk 250 is guided in a first direction R1 in a linearly movable manner in a first bearing point 410 of the housing 400. The first bearing point 410 in the present case is a recess in the housing 400. By means of the two second guiding lugs 255, the torque support disk 250 is guided in a linearly movable manner in the first direction R1 in a second bearing point 420 of the housing 400. The second bearing point 420 in the present case is a recess in the housing 400.

The first bearing point 410 has multiple ribs 430. The ribs 430 are arranged in two groups of ribs 430 spaced apart from one another. In the present case, each group of ribs 430 has precisely eight ribs 430 arranged next to one another. The invention is not, however, restricted to this number of ribs 430. In each of the two groups of ribs 430, the ribs 430 are arranged next to one another in the first direction R1. Each rib 430 extends perpendicularly to the first direction R1. The cross section of the ribs 430 in the present case is approximately triangular. In a non-deformed state, the ribs 430 have a rib height 432. The invention is not, however, restricted to this cross section of the ribs 430.

The tips of the ribs 430 of the two groups of ribs 430 each point in the direction of the first guiding lug 254 of the torque support disk 250. The tips of the ribs 430 of the first of the two groups of ribs 430 point in the direction of the tips of the ribs 430 of the second of the two groups of ribs 430. The first guiding lug 254 is clamped between the ribs 430 of the two groups of ribs 430. The width of the guiding lug 254 is slightly greater than a distance of the tips of the non-deformed ribs 430 prior to assembly of the torque support disk 250 in the housing 400. In this way, the ribs 430 are elastically pretensioned in a mounted state and as a result they clamp the guiding lug 254 between them in such a manner that a clearance between the first bearing point 410 and the torque support disk 250 in the region of the first guiding lugs 254 is reduced in a second direction, in particular a second direction R2 oriented perpendicularly to the first direction R1, without a relative movement in direction R1 being prevented. The ribs 430 are preferably deformed during assembly, not only elastically but also plastically, in such a manner that the first guiding lug 254 is only elastically pretensioned to a limited degree to a structurally adjustable force.

The ribs 430 of the two groups of ribs 430 which are pretensioned in a mounted state of the reduction gear and are thereby flattened each create a first sliding surface 434 in the first bearing point 410. The first guiding lug 254 is in sliding contact with these two first sliding surfaces 434 during operation of the reduction gear.

For simplified assembly of the torque support disk 250 in the housing 400, the ribs 430 each have a chamfer 436. During an insertion of the torque support disk 250 into the first bearing point 410, the first guiding lug 254 of the torque support disk 250 is thereby centered between the ribs 430 and the ribs 430 are elastically, and preferably also plastically, pretensioned.

The second bearing point 420 has multiple ribs 440. The ribs 440 are arranged in two groups of ribs 440 spaced apart from one another. In the present case, each group of ribs 440 has precisely eight ribs 440 arranged next to one another. The invention is, however, not limited to this number of ribs 440. In each of the two groups of ribs 440, the ribs 440 are arranged next to one another in the first direction R1. Each rib 440 extends perpendicularly to the first direction R1. The cross section of the ribs 440 is roughly triangular in the present case. The ribs 440 have a rib height 442 in a non-deformed state. The invention is, however, not limited to this cross section of the ribs 440.

The tips of the ribs 440 of the two groups of ribs 440 each point in the direction of a second guiding lug of the torque support disk 250. The tips of the ribs 440 of the first of the two groups of ribs 440 point in the direction of the tips of the ribs 440 of the second of the two groups of ribs 440. The second guiding lugs are clamped between the ribs 440 of the two groups of ribs 440. A distance between two sides of the second guiding lugs 255 facing a group of ribs 440 in each case is slightly greater than a distance of the tips of the non-deformed ribs 440 prior to assembly of the torque support disk 250 in the housing 400. In this way, the ribs 440 are elastically pretensioned in an assembled state and thereby clamp the two second guiding lugs 255 between them in such a manner that a clearance between the second bearing point 420 and the torque support disk 250 in the region of the second guiding lugs 255 is reduced in a second direction, particularly a second direction R2 oriented perpendicularly to the first direction R1, without preventing a relative movement in direction R1. The ribs 440 are preferably deformed during assembly, not only elastically but also plastically, in such a manner that the second guiding lugs 255 are only elastically pretensioned to a limited degree to a structurally adjustable force.

The ribs 440 of the two groups of ribs 440 which are pretensioned in an assembled state of the reduction gear and are thereby flattened each create a first sliding surface 444 in the second bearing point 420. Each of the two second guiding lugs is in sliding contact with one of the two second sliding surfaces 444 during operation of the reduction gear.

For simplified assembly of the torque support disk 250 in the housing 400, the ribs 440 each have a chamfer 446. During an insertion of the torque support disk 250 into the second bearing point 420, the second guiding lugs 225 of the torque support disk 250 are thereby centered between the ribs 440 and the ribs 440 are elastically, and preferably also plastically, pretensioned.

The features disclosed in the aforementioned description, claims and drawings may be of importance, both individually and also in combination, to the realization of the invention in its different embodiments.

Although the invention was described in detail in the drawings and the preceding representation, the representations should be understood as illustrative and exemplary and not limiting. In particular, the choice of the proportions of the individual elements depicted in the drawings should not be interpreted as necessary or limiting. Furthermore, the invention is not, in particular, limited to the exemplary embodiment explained. Further variants of the invention and its embodiment result for the person skilled in the art from the preceding disclosure, figures and claims.

Terms used in the claims such as "include" and "have", "comprise", "contain" and the like do not preclude further elements or steps. Use of the indefinite article does not preclude a plurality.

LIST OF REFERENCE NUMBERS

100 Gear motor
110 Electric motor
112 Motor output shaft
200 Reduction gear
210 Housing
211 Bearing point
212 Housing cover
214 Cover opening
216 Housing opening
218 Screw
220 Worm
225 Worm gear
226 Eccentric
228 Bearing surface
230 Output shaft
232 Axis of rotation
240 First gear wheel
241 Base body
242 External toothing
243 Bearing opening
244 Guiding pin
250 Torque support disk
251 Through opening
252 Base part
253 Guiding groove
254 First guiding lug
255 Second guiding lug
260 Second gear wheel
262 Internal toothing
264 Bearing collar
270 Output pinion
300 Eccentric
310 Base body
312 Outer contour portion
320 Bearing surface
330 Bearing element
340 Spring element
342 Spring element
400 Housing
410 Bearing point
420 Bearing point
430 Rib
432 Rib height
434 Sliding surface
436 Chamfer
440 Rib
442 Rib height
444 Sliding surface
446 Chamfer
H Height
R1 First direction
R2 Second direction

The invention claimed is:

1. A reduction gear having a housing, a first gear stage and a second gear stage, wherein the second gear stage comprises an externally toothed first gear wheel and an internally toothed second gear wheel which meshes with the first gear wheel and is at least indirectly connected non-rotatably to an output and a circumferential eccentric which is driven by the first gear stage, for driving a relative rolling motion from the second gear wheel to the first gear wheel, the first gear wheel being moved by the eccentric on a circular path, and a torque support disk which is arranged axially next to the first gear wheel and prevents the first gear wheel from performing a relative rotation with respect to the housing, wherein the torque support disk is guided in a first direction in a linearly movable manner in at least one bearing point of the housing along at least two sliding surfaces of the at least one bearing point, wherein at least one sliding surface of the bearing point is formed by at least one rib arranged in the bearing point, wherein the rib bears against the torque support disk and the rib elastically pretensions the torque support disk in a direction of a further sliding surface of the bearing point in such a manner that a clearance between the bearing point and the housing in a second direction is reduced.

2. The reduction gear as claimed in claim 1, wherein the second direction is oriented perpendicularly to the first direction.

3. The reduction gear as claimed in claim 1, wherein the first gear wheel is guided in the torque support disk in a linearly movable manner in the second direction.

4. The reduction gear as claimed in claim 1, wherein the at least one bearing point comprises two bearing boints in which the torque support disk is guided.

5. The reduction gear as claimed in claim 4, wherein each of the two bearing points exhibits two sliding surfaces having one rib or multiple ribs.

6. The reduction gear as claimed in claim 5, wherein the ribs are plastically and elastically deformed.

7. The reduction gear as claimed in claim 1, wherein the at least one rib extends perpendicularly to the first direction.

8. The reduction gear as claimed in claim 1, wherein the torque support disk is produced from metal.

9. The reduction gear as claimed in claim 1, wherein the housing is produced from a plastic.

10. The reduction gear as claimed in claim 1, wherein the torque support disk is a flat, disk-shaped component.

11. The reduction gear as claimed in claim 1, wherein the at least one rib has a chamfer for a simplified assembly of the torque support disk in the housing.

12. The reduction gear as claimed in claim 11, wherein all ribs have a chamfer.

13. A gear motor having an electric motor and the reduction gear as claimed in claim 1.

14. The gear motor as claimed in claim 13, wherein the first gear stage comprises a worm connected to a motor output shaft in a non-rotatable manner and a worm gear.

15. The gear motor as claimed in claim 14, wherein the eccentric is fixedly connected to the worm gear.

* * * * *